Aug. 3, 1926.

F. F. CHANDLER ET AL 1,594,495

CONTROL AND TRANSMISSION MECHANISM

Filed Oct. 9, 1920 7 Sheets-Sheet 1

Fig. 1.

Witness:
John Enders

Inventors:
Franklin F. Chandler &
Henry G. Myers,
by Wallace R. Lane
Atty.

Aug. 3, 1926. 1,594,495
F. F. CHANDLER ET AL
CONTROL AND TRANSMISSION MECHANISM
Filed Oct. 9, 1920   7 Sheets-Sheet 2

Witness:
John Enders

Inventors:
Franklin F. Chandler &
Henry G. Myers,
by Wallace R. Lane
Atty.

Aug. 3, 1926.

F. F. CHANDLER ET AL

1,594,495

CONTROL AND TRANSMISSION MECHANISM

Filed Oct. 9, 1920        7 Sheets-Sheet 6

Inventors:
Franklin F. Chandler &
Henry G. Myers,
by Wallace R. Lane
Atty.

Patented Aug. 3, 1926.

1,594,495

UNITED STATES PATENT OFFICE.

FRANKLIN F. CHANDLER AND HENRY G. MYERS, OF INDIANAPOLIS, INDIANA, ASSIGNORS TO ADAPTABLE TRACTOR CO., OF INDIANAPOLIS, INDIANA, A CORPORATION OF INDIANA.

CONTROL AND TRANSMISSION MECHANISM.

Application filed October 9, 1920. Serial No. 415,859.

This invention relates to control and transmission mechanism, especially adapted for use in tractors, but capable of application in other capacities, and includes improvements on the invention of our co-pending application, Serial No. 174,675, filed June 14, 1917.

In control and transmission mechanism for tractors and other machines requiring the intermittent application and release of power it is of utmost importance that the engagement and release of the various co-acting parts and the performing of the various steps in effecting the same be accurately timed, and so accomplished as to eliminate all unnecessary interference and clashing of parts, and to produce that smoothness of action, maximum of efficiency, and automatic action so highly desirable.

Among the objects of our invention is the accomplishment of the above advantages; further the grouping of the various parts together within a compact casing, and so arranged to give complete reversibility of operation (i. e. to produce normal forward movement in either longitudinal direction of the machine) or not as desired; further to provide an improved gear construction to insure proper and positive intermeshing of the respective gears at the proper time, and to so control the functioning of the other cooperating parts that each operation will be automatically and correctly timed to render impossible any conflict in the operation of the various parts; further to afford a novel form and arrangement of control cam and cooperating parts; further to provide an improved construction of clutch mechanism especially adapted to function in our improved mechanism; further to supply novel means for producing a complete reversibility in direction of operation of the primary operating elements; further to provide a pair of clutches especially adapted to produce rotation of the final driven elements simultaneously in the same or opposite directions at equal or varying speeds; further to contribute a more simple, economical, positive, and efficacious mechanism of the class described than heretofore known; and such further objects, advantages and capabilities as will later more fully appear.

Our invention further resides in the combination, construction and arrangement of parts illustrated in the accompanying drawings, and while we have shown therein a preferred embodiment, we desire the same to be understood as illustrative only and not as limiting the scope of our invention.

Figure 1:
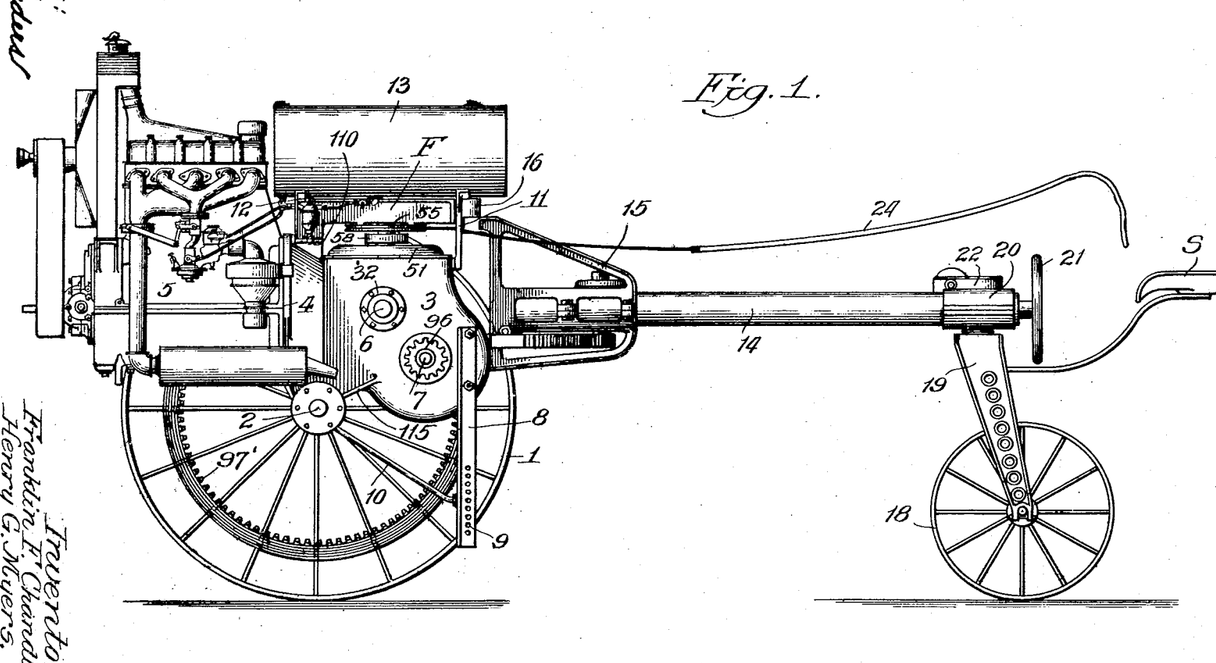
Fig. 1 is a side elevation of a tractor embodying our present invention, the drive wheel on the near side being omitted for the sake of clearness.

Fig. 1 shows our invention applied to a tractor, having bull wheels 1 journalled on bull axles 2, mounted in gear casing 3, upon the flange 4 of which is suitably bolted, or otherwise secured, the internal combustion engine or other suitable motor 5. The main shaft of the transmission mechanism is journalled in the casing 3 at 6, while the bull pinion shaft 7 is journalled in the side of casing 3, as shown in Fig. 1. Secured to the sides of casing 3, and depending therefrom, are bars 8, provided with apertures 9, and suitably braced by members 10 to afford means for coupling various implements thereto when desired. Surmounting the casing 3 and resting upon arms 11 and 12, is a suitable fuel tank 13, which will be provided with the necessary piping connections and their auxiliary parts to supply fuel to engine 5.

Figure 5:
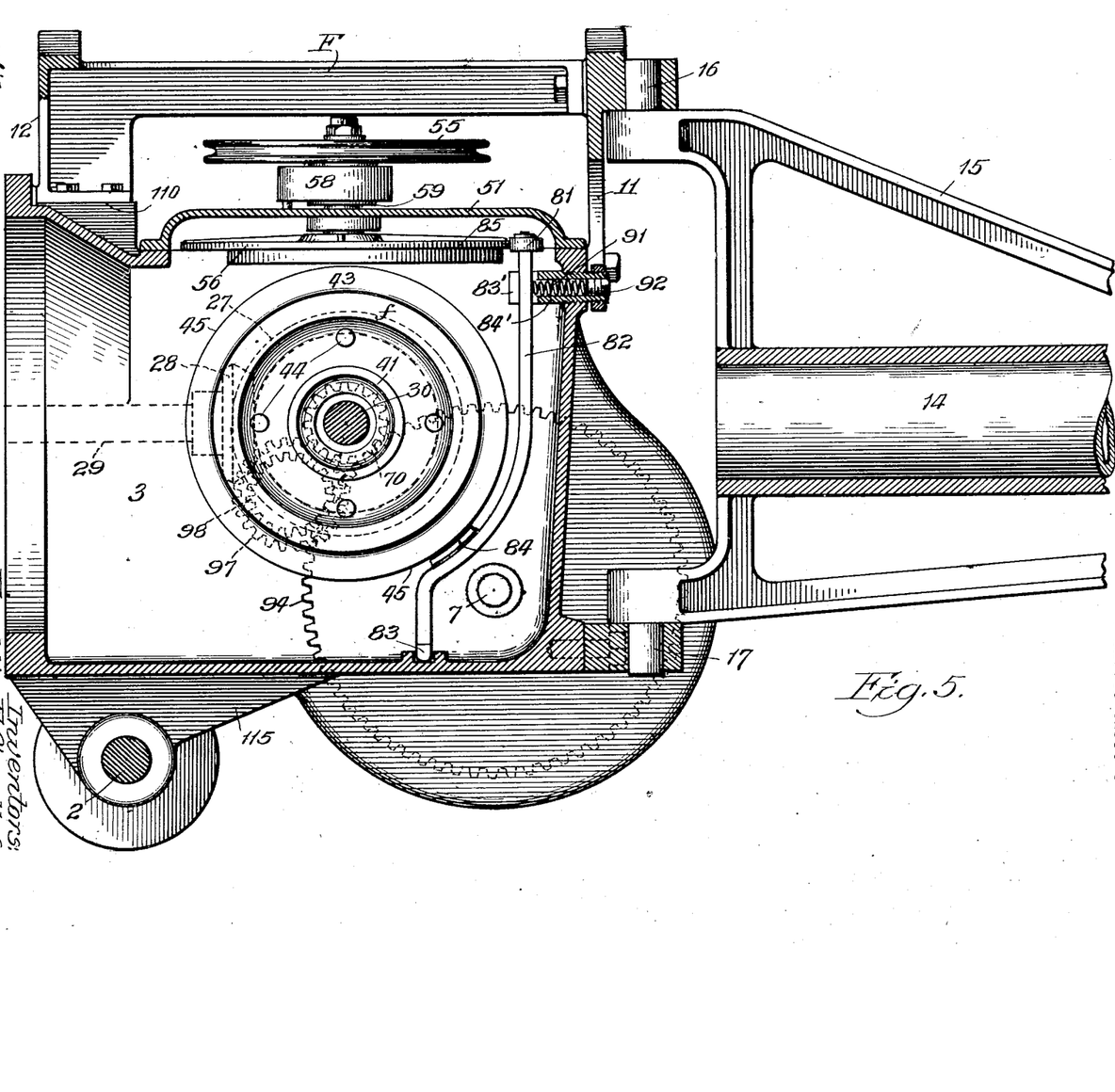
Fig. 5 is a vertical longitudinal section through the central plane of the gear casing, and showing a portion of the tail beam and its pivotal connections.

Extending rearwardly from casing 3 is the tail beam 14, which is rigidly supported in bracket 15, which in turn is pivotally mounted to casing 3 by the vertically aligned journals 16 and 17 (see Fig. 5). The free end of tail beam 14 is supported upon the ground by means of caster wheel 18, carried by yoke 19, which in turn is swivelly connected to attaching members 20, and the caster wheel 18 may be guided in its movement by means of hand lever 1 (see Fig. 2) through the medium of suitable worm gearing or the like operating within casing 22, and operatively connected with the spindle of yoke 19. Also suitably attached to yoke 19 is the operator's seat S, from which he may steer the tractor by means of a pair of reins 23 and 24, through the medium of mechanism to be hereinafter more fully described.

Figure 3:
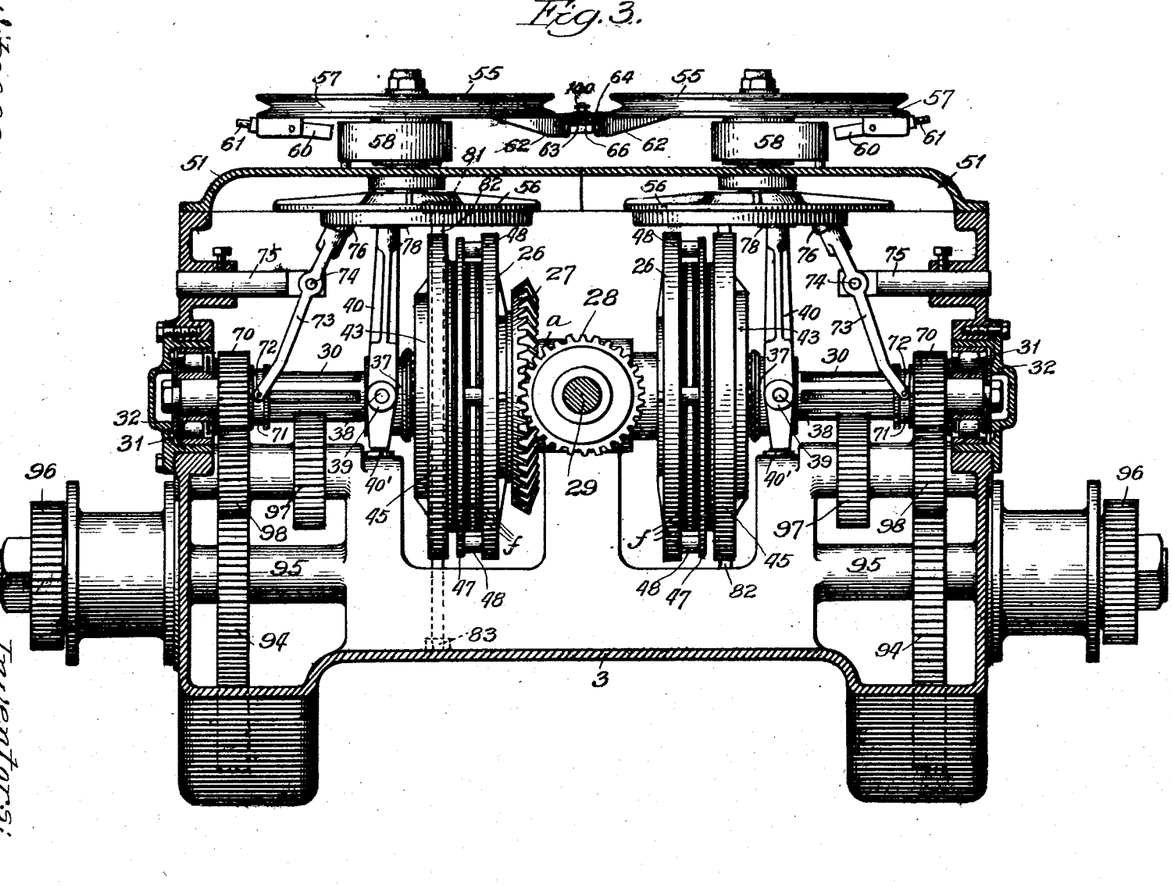
Fig. 3 is a vertical transverse section through the transmission gear case, taken on a plane just forward of the friction clutch members, and looking toward the rear.
Figure 4:
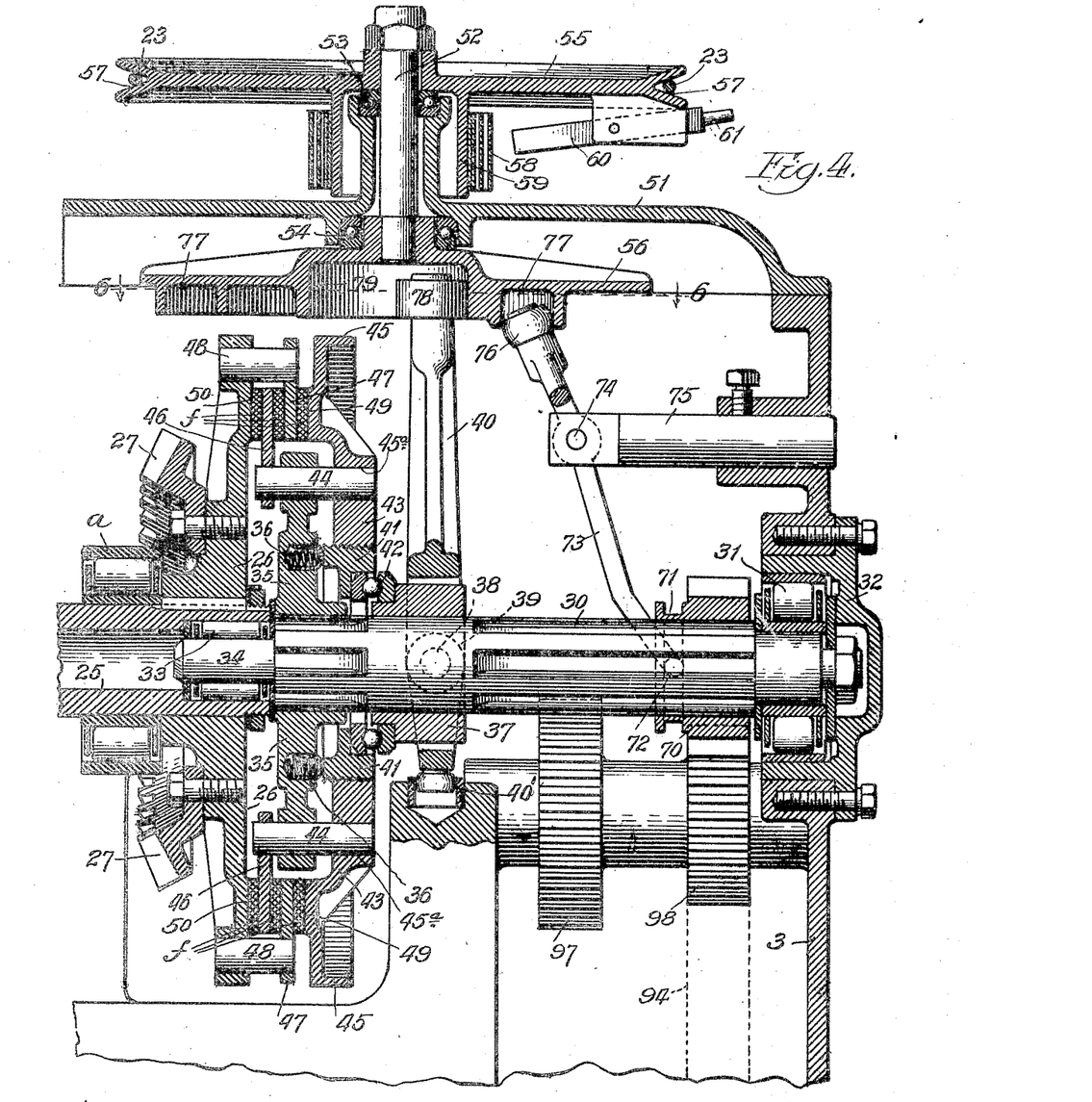
Fig. 4 is a fragmentary vertical transverse section taken on a plane passing through the center of the friction clutch and control cam, and showing the inner portion of one half of the casing, and its contents when looking toward the front.

Suitably journalled in casing 3, by means of roller bearings, or the like, a, is clutch shaft 25, having keyed or otherwise suitably fixed at each end the clutch body 26, to the inner face of one of which (the right hand one as shown in Fig. 4 for the sake of illustration) is secured a bevel gear 27, adapted to be driven by the bevel pinion 28 (see Fig. 3) fixed upon shaft 29, which forms an extension of the drive shaft of the engine. Extending in alignment from each end of clutch shaft 25 is an extension shaft 30, which is journalled at its outer end in bearings 31, suitably mounted in caps 32, and at its inner end in bearings 33, cooperating with extension 34, extending into clutch shaft 25. Keyed or otherwise fixed to the inner end of shaft 30 is clutch spider 35, having mounted at suitable circularly spaced intervals therein, spring members 36, for a purpose to be hereinafter described. Loosely mounted on shaft 30 is collar 37, having trunnions 38, which in turn are pivotally mounted in apertured portions 39 of clutch closing lever 40, whereby collar 37 may be moved longitudinally of shaft 30, when desired. Lever 40 is fulcrumed to casing 3 by means of ring 40' mounted in a suitable pedestal or support within the casing and within which ring is inserted the spherically shaped lower end of lever 40, thus permitting free pivotal movement of the lever in the plane of shaft 30, but in conjunction with collar 37 preventing sidewise movement of the lever laterally of shaft 30. Positioned opposite and in contact with spring members 36 is clutch adjusting member 41, between which and collar 37 are mounted suitable ball bearing members 42, whereby movement may be transmitted from collar 37 to clutch adjusting member 41. Threaded in engagement with adjusting member 41 is clutch closing plate 43, having symmetrically spaced pins 44, and a marginal rim 45. Pins 44, fixed in clutch spider 35, have longitudinal sliding movement through openings 45ª, and at their inner ends pass through clutch plates 46. Positioned between clutch plates 46 and closing plate 43, is a further clutch plate 47, carried by pins 48, which are fixed in clutch body 26, and slidably mounted in openings in plate 47, as shown. Positioned between faces 49 and 50 of closing plate 43 and clutch body 26, respectively, and plates 46 and 47, are circular plates or rings of preferably fibrous material f, to provide suitable friction bearing surfaces.

Figure 2:
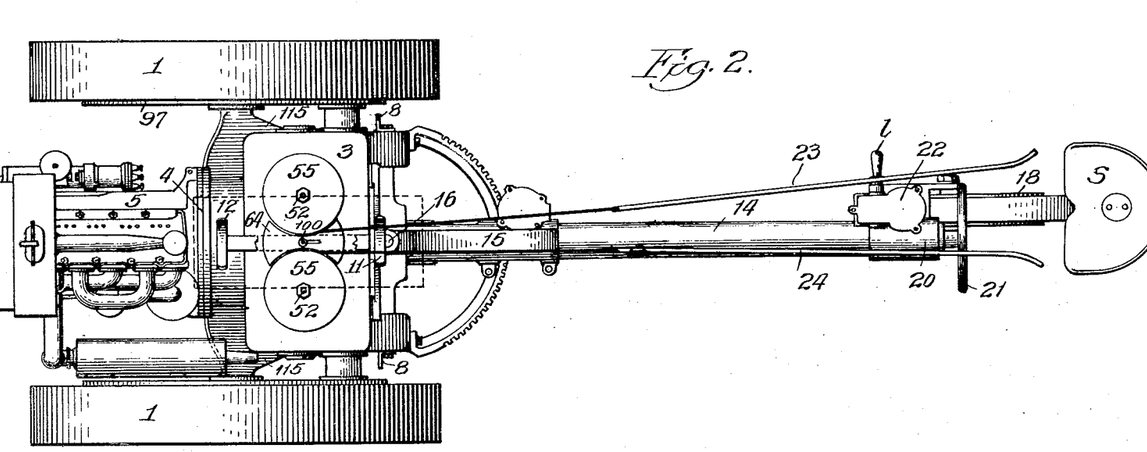
Fig. 2 is a plan view of the tractor shown in Fig. 1.
Figure 11:
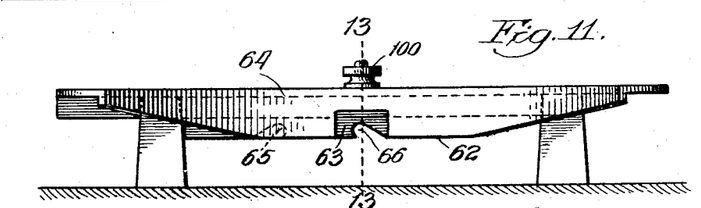
Fig. 11 is a side elevation of one of the guide plates for the latch or control finger.
Figure 12:
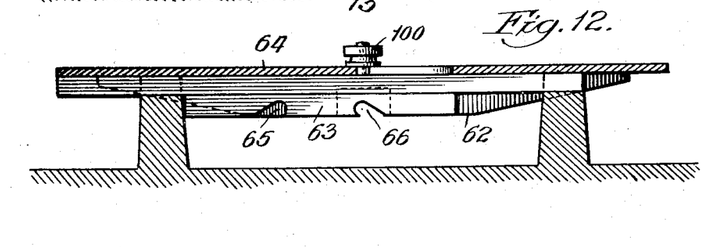
Fig. 12 is a vertical longitudinal section through the median plane of Fig. 11.
Figure 13:
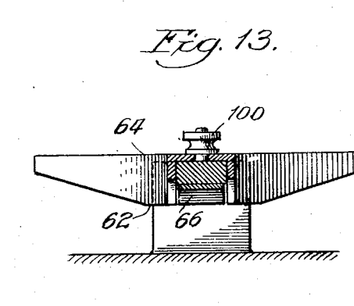
Fig. 13 is a vertical transverse section through the median plane of Fig. 11, on the line 13—13 of Fig. 11.

This description is applied to the mechanism as shown in Fig. 4, this being one half of the mechanism within casing 3, it being understood that the other half of the contents of this casing are similar and symmetrical to those shown in Fig. 4, except for the omission of bevel gear 27. Casing 3 is provided with a removable cover 51, made in two parts, being divided along the longitudinal central vertical plane of the casing to facilitate their removal in a lateral direction. Suitably journalled in cover plate 51, by means of spindle 52 and ball bearings or other suitable bearings 53 and 54, are the primary operating element or control sheave 55, and the control element or control cam 56, the former being above the cover, and the latter therebelow. Line or rein 23 is adapted to engage the groove 57 of sheave 55, extending rearwardly from the inner side of this right hand sheave, as shown in Fig. 2. In order to rotate sheave 55 in a direction opposite to that produced by a pull upon rein 23, a spring 58 (which may be either spiral or coil, as desired) is secured at one end to hub 59 of sheave 55, and at its other end fixed by means of a suitable pin, or the like, to cover plate 51, this spring being put under the desired tension when said parts are assembled. Pivotally connected with one side of sheave 55, is latch finger 60, it being heavier at its inner end in order to constantly hold its outer end 61 in engagement with the under face of either flange 62 (see Fig. 11) or block 63 (dependent upon the degree of rotation of sheave 55), when the pin is adjacent these parts. Block 63 is longitudinally slidable within guide plate 64, and is provided with two spaced and oppositely extending notches 65 and 66, the particular one of these notches being in position to engage pin 61, being dependent upon whether normal forward operation of the tractor is desired in one longitudinal direction or the other. In other words, whether it is desired to operate reins 23—24 from the seat S or from the opposite end of the tractor. The position of block 63 as shown in Figs. 11 and 12 respectively is for operation of reins 23 and 24 from seat S, or in other words to produce normal forward motion of the tractor to the left as viewed in Fig. 1. The necessary arrangement and adjustment of parts to permit of operation of the reins from the left hand end of the tractor as shown in Fig. 1, in other words, to permit of normal forward movement of the tractor as shown in Fig. 1 to the right will be hereinafter described and pointed out.

Referring to Fig. 4, shift gear 70 is mounted for longitudinal sliding movement upon shaft 30, and provided on its hub with circumferential groove 71, adapted to receive inwardly extending fingers 72, formed upon the lower end of shift lever 73, which in turn is pivoted at 74 upon the bearing or support 75, fixed to casing 3. The upper end of shift lever 73 is provided with a spherical roller 76, adapted to engage race 77 of control cam 56, while the upper end of clutch closing lever 40 is provided with roller 78 adapted to engage cam surface 79 of said control cam 56. This control cam is shown more in detail in Figs. 6 and 7. Roller 78 is provided with ball bearings of the type known commercially as the S. K. F. type which are self alining to compensate for any departure from parallelism between the cam surface 79 and axis of clutch closing lever 40, caused by change in angularity of said lever or from irregularities that might occur in the cam surface. Cam 56 will be seen to have the irregular surface formation 80, formed upon its marginal edge, adapted to cooperate with roller 81, carried by the upper end of clutch brake lever 82, the lower end of which is pivoted at 83 in any suitable manner to casing 3. This clutch brake lever carries adjacent its lower end brake pad 84, which, when roller 81 is in engagement with either marginal edge 85 (see Figs. 6 and 7) or the extremity of projections 86—87 of control cam 56, is slightly spaced away from marginal rim 45 of clutch closing plate 43; but when roller 81 is within any of the depressions 88, 89 or 90, brake pad 84 will be in contact with rim 45 of said closing plate 43, for a purpose to be hereinafter more fully pointed out. It is to be noted in Fig. 5 that brake lever 82 is normally held in engagement with the marginal rim of control cam 56, by means of coil spring 91 pressing against lever 82 at one end, and being adjusted in compression by adjusting nut 92 at the other end. Said brake lever 82 being held within slot 83' of member 84' carrying spring 91.

Referring to Figs. 3, 4, and 5 shift gear 70 may be moved along shaft 30 by lever 73, to assume any one of three positions, namely, to the right as shown in Fig. 4 to engage gear 94, which is mounted upon shaft 95, upon the outer end of which shaft is positioned bull pinion 96, which in turn meshes with the gear 97' carried by the bull wheel; or to the left to engage gear 97, fixed upon a shaft, upon the opposite end of which is fixed idler gear 98, which runs idly when shift gear 70 is in direct engagement with gear 94, but which produces reverse rotation of gear 94 when shift gear 70 is in mesh with reverse gear 97. The neutral position of shift gear 70 will be midway of gears 97 and 98, and when in said neutral position no rotation of the bull wheels will be effected.

Figures 6, 7, 8, 9, 10:
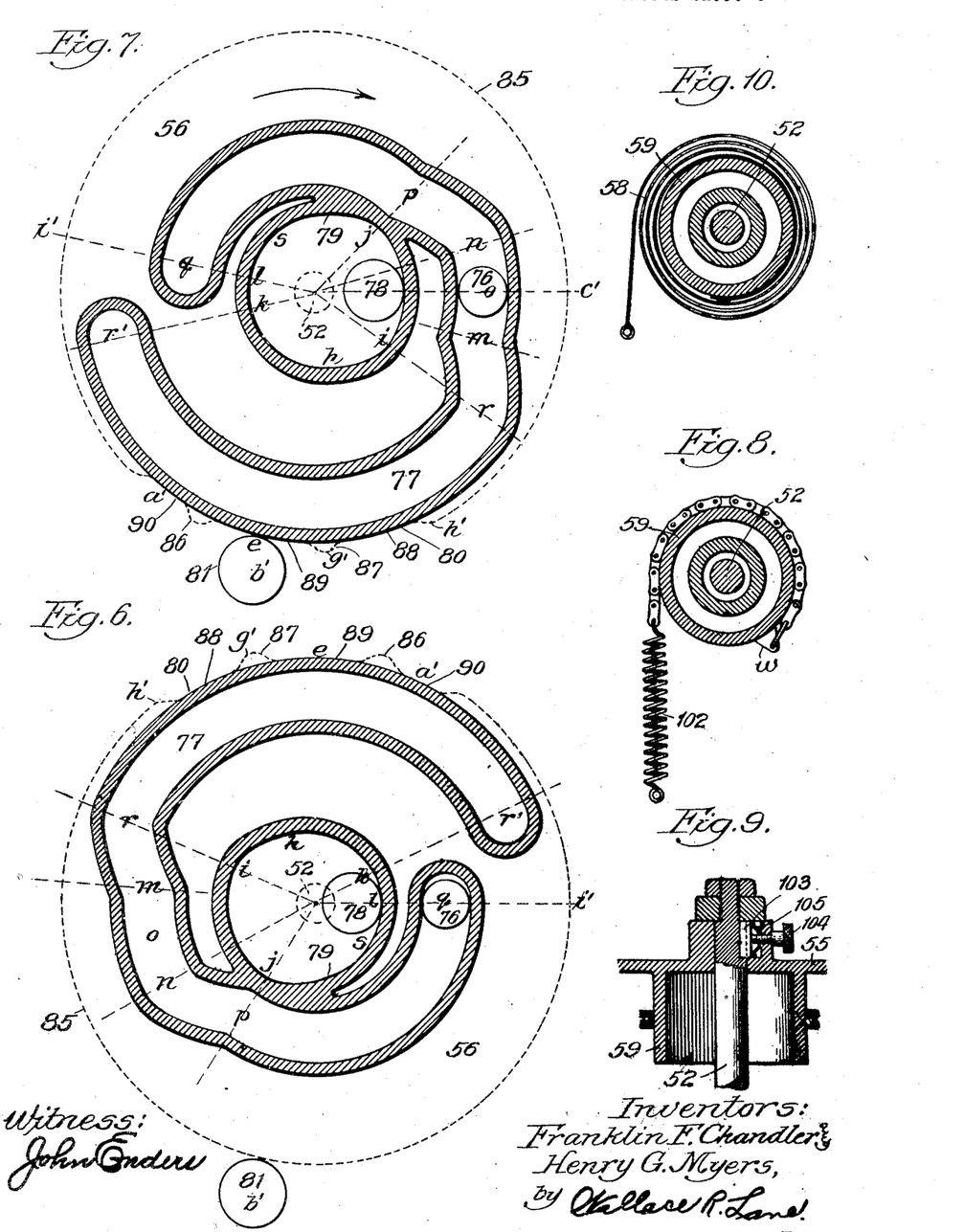
Fig. 6 is a plan sectional view of the control cam taken on line 6—6 of Fig. 4, and showing the parts in clutch-closed position, the periphery of the top plate of the cam being shown in dotted lines.
Fig. 7 is a view similar to Fig. 6, but showing the control cam rotated through substantially a half turn to bring the various parts into clutch-opened position.
Fig. 8 is a horizontal section taken through the hub of one of the control sheaves, and showing the arrangement of a coil spring and its connections for operating the control cam in one direction.
Fig. 9 is a fragmentary vertical transverse section through the hub portion of one of the control sheaves, showing one way in which the sheave may be quickly unlocked from the spindle and rotated to wind the coil spring of Fig. 8 in opposite direction to effect complete reversibility of operation of the control sheaves.
Fig. 10 is a view similar to Fig. 8, but showing the application of a spiral spring used when complete reversibility of operation is not required.

By reference to Figs. 6 and 7 the details of control cam 56 will be more fully understood, these views being taken looking down on the control cam with the upper body plate removed; in other words, a section on line 6—6 of Fig. 4. The peculiar formation of cam race 77 will be seen to comprise the outer portion lying between radial lines $r$ and $r'$, which is concentric with spindle 52, and roller 76 lies within this portion of race 77, while shift gear 70 is in full engagement with reverse idler 97, and positively holds the shift gear from moving out of said engagement. The passage of roller 76 from this portion of the race to that portion lying between radial lines $m$—$n$ accompanies the movement of shift gear from reverse position to neutral. That portion of race 77 lying between radial lines $m$—$n$ is concentric with spindle 52, and from radial lines $n$ to $p$ represents that portion of the race traversed by roller 76, while shift gear 70 is being carried by lever 73 from neutral to engagement with pinion 94, and from $p$ to $q$, race 77 is concentric with spindle 52, to positively hold shift gear 70 in engagement with gear 94, during this portion of rotation of control cam 56, and prevent any possibility of the shift gear from moving out of engagement with said gear 94 during this period. Simultaneously with movement of roller 76, transversely by means of race 77, roller 78 will be moved by cam surface 79 to operate clutch closing lever 40, as follows: That portion of cam surface 79 lying between radial lines $i$ and $j$, is concentric with spindle 52, and farthest away from the center of said spindle, thus representing position of roller 78, while the clutch is in its farthest open position as shown in Fig. 7. Upon rotation of cam 56 in the direction of the arrow in Fig. 7, roller 78 will engage the inclined surface $j$—$l$, which will move roller 78 in a direction toward spindle 52 to effect closing of the clutch in an obvious manner. Portion $l$ to $k$ of cam surface 79 is concentric with spindle 52. The curvature of the spiral incline between $i$ and $k$ and $j$ and $l$ is so designed that the angularity is greater for those portions nearer points $i$ and $j$ than it is for those portions nearer $k$ and $l$, thus producing quick engagement of the friction clutch surfaces, and effecting a more rapid closing action at the beginning of passage of roller 78 over one or the other of these portions of race 79. The lost motion between the clutch faces and friction pads $f$, is taken up by this quick action at the beginning of the closing period, and after these surfaces actually begin to come into contact the steepness of incline of surfaces $j$—$l$ or $i$—$k$ (depending upon the direction of rotation of control cam) becomes less and less as the points $k$ and $l$ are approached, so that by the time the concentric portion $k$ or $l$ is reached, the rate of angularity is so slight that it has the effect of producing practically an infinite pressure against roller 78, thus giving a maximum clutching pressure with only a comparatively small force required to rotate the control cam. Likewise if a constant force is applied for the purpose of rotating the control cam, the lever arm $k^{52}$ or $l^{52}$ of the moment producing this pressure, is less than the length of the lever arm $j^{52}$ or $i^{52}$, so that advantage is taken of this decreased lever arm just at the moment when the greatest pressure is necessary for completely closing the clutch, and this advantage comes just at the time when the rate of incline of this curve is the least, so that the combination of the results of the force produced in this way enables the application of substantially any desired amount of closing pressure with the use of only a very small force used for rotating the cam to produce such result. While in the above we have referred to two forces which may be used either singly or in conjunction, to produce an extremely large clutch closing pressure, with an extremely small rotative force on the cam, there is also a third and distinctly different way of augmenting either or both of these should it become desirable to do so, which may be effected in the following manner. As is, of course, well understood, as a spring under tension is released, the tension becomes less as the spring becomes shorter, and which condition would exist as the spring encircling the hub of sheave 55 becomes unwound as it rotates the cam in a direction to give forward movement to the tractor. To compensate for this lesser spring action, it is proposed to provide the hub or other desirable part of the sheave wheel with a projection or eccentric portion $w$ (see Fig. 8) which, when the spring has shortened to this position of least tension will lie substantially at right angles to the line of spring pull, thus positioning these parts to give the maximum advantage to the pull of the spring.

Again referring to Figs. 6 and 7 the action between roller 81 and depressions 88, 89, 90, and projections 86 and 87 of the marginal edge of control cam, will be readily understood. These projections 86 and 87 are so positioned that brake pad 84 will be released from the periphery of closing plate 43 to permit a slight rotation caused by the inherent friction of the clutch parts just at the moment that the teeth of shift gear 70 are seeking registry with the spaces of either gear 94 or reverse gear 97. As soon as these teeth find the spaces they are seeking to enter, roller 81 will have passed beyond one of projections 86 or 87, thus permitting roller 81 to drop into one of said depressions and again apply the brake to stop further rotation of the clutch and hold the same at rest until the teeth and shift gear 70 are fully in mesh with those of the gear with which it is moving into engagement. This is a very important feature, since it prevents clashing and stripping of the teeth, and also eliminates the application of any pressure between the teeth moving into engagement, thus insuring an easy, greater and unretarded engagement of the teeth. It is obvious unless shift pinion 70 is made to revolve slowly so that its teeth will find the spaces of the gear, the teeth of the approaching gears might hit against each other and jam sufficiently to prevent engagement. Also if the rotation of shift gear 70 is too great its teeth would too quickly pass the spaces of the other gear and produce serious clashing and prevent engagement of the teeth; also if the teeth of the shift gear have started into engagement with the spaces of the opposite gear too great a tendency to rotate shift gear 70 might create friction sufficient to render it so great as to make it difficult if not impossible to slip the inter-engaging teeth together. It is thus seen that the production of a small amount of rotation, properly controlled, is of extreme importance in the proper meshing of the teeth. Also to accomplish this result effectively, the movements of the shift pinion 70 must be controlled and timed automatically and positively, which results we have accomplished as will be readily understood from the above in connection with the drawings.

In the operation of the mechanism described above, a rearward pull upon rein 23 (similar action being produced by manipulation of rein 24 in the mechanism of the other half of the gear case) will rotate sheave 55 in a counter-clockwise direction when viewed from above, the first effect of which will be to move pin 61 out of slot 66 in block 63. If the rein is then suddenly released, the sheave will rotate rather quickly under action of its spring and cause pin 61 to jump gap 66 to permit rotation of sheave 55 in a clockwise direction when viewed from above. This action will rotate race 79 to bring the spiral incline $j$—$l$ into contact with roller 78. Simultaneously with this movement roller 76 will move along portion $n$—$p$ of race 77 to shift shift gear 70 from neutral into engagement with gear 94. Simultaneously with this movement and just at the time when the gear teeth of shift gear 70 are seeking the spaces between those of the opposing gear teeth roller 81 will have passed over projection 87 to release brake 84 to permit a slight rotation due to the inherent friction between the parts of the friction clutch and shift gear 70, to enable the teeth to find the spaces between the opposing teeth as described above. Roller 81 will then drop into depression 88 and again move the brake to stop further rotation of closing plate 43 to lock the parts against further movement until the teeth have been fully engaged, which occurs when roller 76 passes from $n$ to $p$ in Fig. 6. Further rotation of the control cam will positively hold the shift gear in engagement with gear 94 by virtue of roller 76 being held in the concentric portion $p$—$q$ of race 77, while roller 78 will be moved to close the clutch parts through contact with the inclined spiral $j$—$l$ as pointed out above. A pull on the reins in a rearward direction will carry out these steps in a reverse manner, as will be fully understood from an inspection of Figs. 6 and 7.

It will be clear, therefore, that if the above described forward movement (that is the reins being fully released) has been produced, that a rearward pull on the rein will first decrease the pressure which has been imposed on the clutch parts. This will result in a lesser amount of power being transmitted by the clutch, which in turn will result in a retardation of movement of the bull wheel, which has been driven by this clutch, and if the bull wheel on the other side of the tractor is allowed to go forward at full speed, the result will be a turning movement of the tractor in a direction toward the retarded bull wheel. It will also be seen that if a rein under these conditions be pulled only slightly, there will be only a slight lessening in the grip of the clutch members with a consequent slight lessening of power transmitted, which results in a large radius of turning movement. If the rein pull is increased the amount of power transmitted by its respective clutch is still further decreased, which results in a shorter radius of turning, so that if one clutch is completely disengaged, and the other clutch still fully engaged, the tractor will turn in a minimum radius. If the rein be pulled to an extent sufficient to disengage the clutch, no power will be transmitted to the bull wheel, even though the shift pinion be not shifted to neutral position. In other words, after full forward motion of the tractor has been produced, it can be completely steered, stopped and started again in a straight line, or in a curve, without the necessity of shifting the pinion back into neutral position.

When it is desired to drive the tractor only from seat S, and with normal forward movement of the tractor being to the left in Fig. 1, the reverse block 63 will be locked to present slot 66 for engagement with pin 61, and held in such position by tightening nut 100 in Fig. 11. In such instance, the spiral spring 101 shown in Fig. 10 may if desired be used. When, however, it is desired to effect complete reversibility of operation, that is, to produce normal forward to the right, as shown in Fig. 1, reverse block 63 will be moved longitudinally to present slot 65 for engagement with pin 61, and the chain and coil spring 102 shown in Figs. 8 and 9 will be substituted for the spiral spring. To effect this reversibility of operation, the key 103 holding sheave 55 and spindle 52 to rotate with each other, will be moved laterally by grasping handle 104, and pulling outwardly thereon against the tension of a leaf spring, or the like, 105, and at the same time rotating sheave 55 to wind the chain connected to the coil spring 102 therearound in the opposite direction, or in other words, to unwind said chain and place the spring 102 under tension in the opposite direction around the hub of the sheave, and when the coil spring is so rewound release handle 104 to return key 103 to again lock sheave 55 and spindle 52 together for rotation. It will, of course, be understood, that rotation of sheave 55 in one direction will be effected by a pull upon the rein 23, while its rotation in the opposite direction will be effected by the spring wound around the hub thereof.

Since clutch parts are subjected to greater or less wear, it is highly desirable to provide adjusting means to compensate therefor, and to this end we have provided as shown in Fig. 4, the clutch adjusting member 41, which, when it is desired to overcome wear and create a more positive gripping action, may be slightly unscrewed from engagement with closing plate 43, so as to carry the engaging face 49 further to the left in Fig. 4, thus tending to close any gap created by wear, and to enable adjustment of the gripping parts as desired. The closing plate 43 will be forced to the left into gripping action by movement of the upper end of closing lever 40 to the left as shown in Fig. 4, and when control cam 56 releases roller 78, closing plate 43 will be moved away from the clutch body under action of the springs 36 exerting their force against the inner edge of adjustment element 41.

It will be seen from the above that the first movements of the control cam are:
1. To unlock it from neutral position.
2. To shift the shift pinion.
3. To close the clutch.

The resulting advantages are very marked, and make it impossible for the operator to close the clutch until the shift pinion 70 is in full engagement. Should the gear teeth for any reason stick while the shift gear is being moved, sticking would occur and the reaction on the control member would be at once noticeable. Such sticking, however, is prevented by the sliding rotation given to the shift gear and the correct timing of the same.

Figure 14:
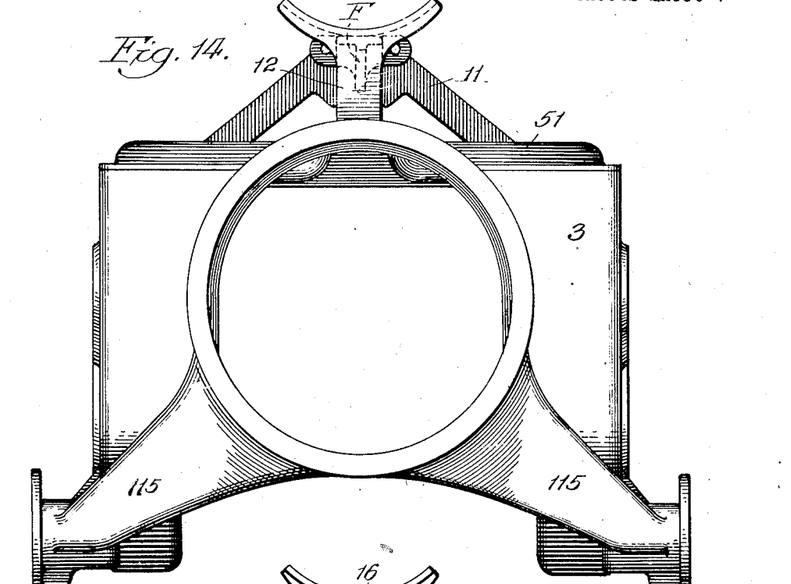
Fig. 14 is a front elevation of the gear case.
Figure 15:
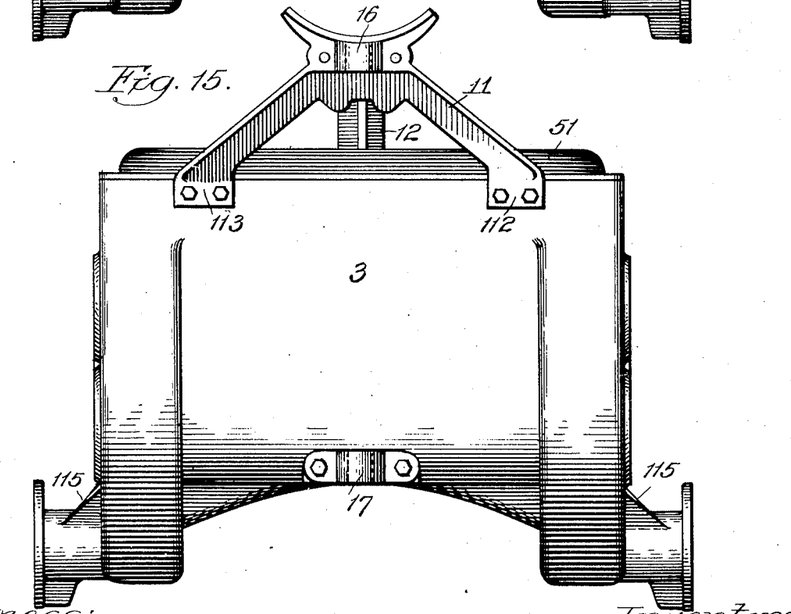
Fig. 15 is a rear elevation of the case shown in Fig. 14.

It is to be noted that casing 3 shown more in detail in Figs. 14 and 15, is made in one casting, and is provided with a brace or strut F, bolted rigidly to the casing at 110 (see Fig. 1) and is connected to the rear wall of the casing by a Y-brace 11, at points 112 and 113. This brace or support F forms a seat for the fuel tank 13. The Y-brace 11 is as described above provided with the bearing 16, which forms one of the pivotal supports for the tail beam bracket 15, the lower support 17 for the same being shown more clearly in Figs. 5 and 15.

It is of importance to note that the lines of stress resisted by the metal of case 3 fall logically between those points where the greatest stresses are produced, for instance, the strong connecting brace between the two bull wheel axles gives the strongest kind of bracing between these points, and this brace connects up longitudinally with the flange on which the engine is bolted, and through which the engine stresses are transmitted into the case and to the bull wheels. This is further strengthened by ribs 115 between the bull wheel axle and the bull wheel pinion bearings, to take care of the large stresses occurring between these points. The brace or support F is positioned as far as practicable above the engine to give a longer lever arm in the moment produced by the engine torque, and consequently transmits a lesser pressure when in operation to the upper tail beam hinge 16. Also Y-brace 11 by reason of its form draws the sidewise reaction of the hinge 16 during the period when the tractor is being moved forward, directly into the rear wall of the case where the stresses are properly diffused toward those points best capable of receiving them.

While we have described our improved control and transmission mechanism as applied to a tractor, we wish it to be understood that the same can be applied to other machines and in other capacities without departing from the spirit of our invention.

Having now described our invention, we claim:—

1. In a tractor, a primary operating element, a control cam operated thereby, a clutch, a shift gear rotated by said clutch, a driven gear adapted to mesh with said shift gear, means actuated by the cam to control the clutching operation of the clutch, and means connected to said cam and to the clutch for permitting a slight rotation of said clutch and shift gear until its teeth start into mesh with those of said driven gear in one position of the cam and then preventing further rotation of such clutch and gear until said teeth are completely meshed in another position of the cam.

2. In a tractor, a control cam, a clutch, a shift gear and driven gear whose teeth are respectively adapted to intermesh, means actuated by said cam for controlling the clutching operation of said clutch, means operated by said cam for automatically permitting a slight rotation of said shift gear until said teeth start into engagement when the cam is in one position and then to hold said gears against rotation until said teeth are fully in mesh when the cam is in another position.

3. In a tractor, a control cam, a clutch, a shift gear and driven gear whose teeth are respectively adapted to intermesh, means cooperating with said cam and clutch to automatically control said clutch to permit slight rotation of said shift gear until said teeth start into engagement and then to hold said gears against rotation until said teeth are fully in mesh, said control cam automatically moving said shift gear into complete engagement with said driven gear during said rest period of the clutch.

4. In a tractor, a control cam, a clutch, a shift gear and driven gear operatively connected to the clutch whose teeth are respectively adapted to intermesh, means cooperating with said cam and said clutch to automatically control the clutching operation of said clutch, said means including means to permit slight rotation of said shift gear until said teeth start into engagement and then to hold said gears against rotation until said teeth are fully in mesh, said last mentioned means including a brake member automatically held in engagement with said clutch by said control cam to produce said rest period of the latter.

5. In a tractor, a casing having a clutch shaft journalled therein, a friction clutch at each end of said shaft, clutch closing levers pivoted in said casing and adapted to operate said clutches respectively, a pair of control cams each having a cam surface in engagement with one of said levers for operating the same, said cams each having a race and an irregular surface, an extension shaft at each end of said clutch shaft and driven by said clutches respectively, a shift gear longitudinally slidable on each of said extension shafts, a pair of driven gears adapted to selectively mesh with each of said shift gears, a shift lever in engagement with each of said shift gears and also in engagement with said race of said cams respectively, a clutch brake pivoted opposite each of said clutches and each having a portion adapted to engage said irregular surfaces respectively, a spindle fixed to each of said control cams, a sheave wheel fixed on each of said spindles, a latch pin pivoted to each of said sheaves, a block having a notch in which said pins normally rest when said parts are in neutral position, and means to selectively or simultaneously rotate said sheaves to rotate said cams to move said shift gears out of neutral and to permit them to slightly rotate until the teeth of the shift gears start into engagement with the teeth of one or the other of said driven gears, and to then move said clutch brake to hold said clutch and shift gear against rotation and simultaneously move said shift gears into complete mesh with said driven gears.

6. In a tractor, a friction clutch, a shift gear connected therewith, a clutch brake cooperating with the clutch, a control cam having a plurality of operating portions, and connections between the cam and said other parts whereby the first movement of the cam will unlock it from neutral, further cam movement will partially shift the shift gear but permit slight rotation thereof, further movement will operate said clutch brake to hold said clutch and shift gear against rotation while the shifting of said gear is completed, and continued movement of said cam will release said brake and close the clutch to drive the shift gear.

7. In a tractor, a friction clutch, a shift gear connected therewith, a clutch brake cooperating with the clutch, a control cam having a plurality of operating portions, and connections between the cam and said other parts whereby the first movement of the cam will unlock it from neutral, further cam movement will partially shift the shift gear but permit slight rotation thereof, further movement will operate said clutch brake to hold said clutch and shift gear against rotation while the shifting of said gear is completed, and continued movement of said cam will release said brake and close the clutch to drive the shift gear, said control cam being also rotatable in the opposite direction, which reverse rotation will produce all of said movements described above with the exception that the shifting of the shift gear is produced in the opposite direction.

8. In a tractor, a movable control element, a clutch operatively connected to the control element, a shift gear driven from said clutch, a driven gear cooperable with the shift gear, and means operatively connected to the control element and operable to hold the clutch from operation until the shift gear is in full engagement with said driven gear.

9. In a tractor having power means, a clutch having a driving member operated by the power means, a clutch driven member, means for closing said clutch driven member with said clutch driving member, means for operating the closing means, a shift gear operatively connected to said clutch driven member, means for shifting said gear, said gear shifting means being operated by said closing means operating means, and a brake for said clutch driving member and operated by said closng means operating means.

10. In tractor control mechanism, a rotatable operating element having a latch finger oscillatably associated therewith, a stationary element having a notch therein adapted to receive said finger when said operating element is in neutral position, and tension means normally tending to rotate said operating element in one direction, the notch in said stationary element being inclined to permit said finger to be removed therefrom in one direction, but to hold said operating element against rotation in the opposite direction unless released quickly to permit the finger to jump over the notch.

11. In tractor control mechanism, a rotatable operating element having a latch finger oscillatably associated therewith, a stationary element having a notch therein adapted to receive said finger when said operating element is in neutral position and tension means normally tending to rotate said operating element in one direction, the notch in said stationary element being inclined to permit said finger to be removed therefrom in one direction, but to hold said operating element against rotation in the opposite direction unless released quickly to permit the finger to jump over the notch, said stationary element also having a second notch with reverse inclination, and means to permit longitudinal shifting of said stationary element to bring either of said notches into position for engagement by said latch finger.

12. In tractor control mechanism, a rotatable operating element having a latch finger oscillatably associated therewith, a stationary element having a notch therein adapted to receive said finger when said operating element is in neutral position, and tension means normally tending to rotate said operating element in one direction, the notch in said stationary element being inclined to permit said finger to be removed therefrom in one direction, but to hold said operating element against rotation in the opposite direction unless released quickly to permit the finger to jump over the notch, and means to reverse the tension on said operating element.

13. In tractor control mechanism, a rotatable operating element, a guide plate adjacent said operating element, a notched block slidably mounted on said plate, means to lock said block in adjusted position on said plate with the notch exposed, and a latch finger oscillatably associated with said operating element to engage said notch when in neutral position.

14. In tractor control mechanism, a rotatable operating element, a guide plate adjacent said operating element, a block provided with notches and slidably mounted on said plate, means to lock said block in adjusted and selected position on said plate, with a notch exposed, and a latch finger oscillatably associated with said operating element to engage the notch when in neutral position.

15. In a tractor, a rotatable operating element having a latch finger oscillatably associated therewith adapted to normally engage a notch in an adjacent stationary element, a spindle rotated by said operating element, a control element fixed to rotate with said spindle, transmission mechanism, and means connecting the latter with said control element whereby to control the operation of said transmission mechanism when said finger is moved out of said notch.

16. A tractor control mechanism comprising a rotatable operating element, means connected to said element and operable to rotate said element in one direction of rotation, tension means connected to said element and operable to operate said element in another direction of rotation, means normally holding the tension means under a stress, means for increasing the stress effect of the tension means as the tension of the latter decreases, and means actuated by the element to control the movements of the tractor.

17. In tractor control mechanism, a rotatable operating element having a tension spring connected at one end therewith, at a point of greater radius than that portion about which the spring is wrapped when rotation is produced, said point of greater radius being in such relation that when said spring is contracted to a point of lesser operative tension said point of greater radius will be substantially at right angles to the length of the spring which will wholly or in part compensate for the decreased tension in the spring to produce substantially the same torque on the rotatable element, and means actuated by the aforesaid mechanism to control the movements of a tractor.

18. In a tractor, a control cam, a friction clutch, a clutch brake lever operated by said cam and normally held in engagement therewith, a brake actuated by the lever and adapted to engage and be disengaged from said clutch, to control rotation thereof, and means on said cam to intermittently engage and disengage said brake with and from said clutch.

19. In a tractor, a case, a pair of bull wheels journaled therein, a tail beam pivotally connected to said case, a caster wheel and an operator's seat adjacent the free end of said tail beam, a pair of reins for operating said tractor, a pair of rotatable sheaves on said case adapted to be rotated by said reins respectively, means for normally tending to rotate said sheaves in a direction opposite to that of their rotation by said reins, means for normally holding said sheaves in neutral position, and means connecting said sheaves with said bull wheels whereby the latter may be rotated in the same or opposite directions with equal or varying speeds.

20. In tractor control mechanism, a primary rotatable operating element having a force applied thereto at a constant radius, a control cam having an inclined cam surface adapted to be rotated by said primary element, a clutch closing element operated by said cam surface, whereby as the contact of said closing element with said cam surface moves to closed position the radius of the said point of contact decreases to increase the closing advantage.

21. In a tractor, a body portion, a pair of drive wheels, driving mechanism for the wheels, and including a clutch, a driving pinion and means for shifting the pinion into and out of driving operation, and a control cam having cam surfaces operatively connected to the clutch and said means for controlling the operation of the clutch and of the driving pinion, the cam surface controlling the driving pinion effecting this control by shifting it into position for forward, neutral or reverse as desired, and a pair of reins operatively connected to the cam for effecting operation of the clutch and pinion by said cam surfaces.

22. In a tractor, a frame, a pair of drive wheels, driving mechanism carried by said frame, and including a driving clutch and a driving pinion for driving said wheels, a plurality of cam surfaces, one of said cam surfaces upon rotation of the cam operating said cam clutch to throw the same into driving engagement or release, as desired, and the other of said cam surfaces controlling the driving pinion for forward, reverse or neutral positions, and means for rotating said cam surfaces from the seat of a vehicle being drawn by the tractor.

23. In a tractor, a control mechanism including a cam having a plurality of actuating portions, mechanism for propelling the tractor, and means for controlling the propelling mechanism, one portion of said cam holding the controlling means in neutral, another portion shifting the parts into forward driving position, and a third portion shifting them into rearward driving position.

24. A control mechanism for a tractor including a cam having a plurality of cam surfaces, a clutch and a brake therefor, means cooperating with one of the said surfaces to hold the operating parts of the tractor in neutral position, means cooperating with another of the surfaces to hold the clutch substantially stationary, and means cooperating with another of the cam surfaces to throw the parts into driving position.

25. In a control mechanism, a cam having a plurality of cam surfaces, one of which operates a clutch brake, one sets transmission means to produce forward operation and one closes a clutch, all in sequence by one continuous movement of the cam in one direction.

26. In a control mechanism, a cam having a plurality of cam surfaces, one of which operates a clutch brake, one sets transmission means to produce forward operation and one closes a clutch, all in sequence by one continuous movement of the cam in one direction, and all in reverse sequence with reverse continuous movement of the cam by an equal amount.

27. A control mechanism, including a cam and a wheel both rigidly mounted on a shaft so that joint rotation of these parts can be secured, means associated therewith to produce normal rotation of said parts, in one pre-determined direction, a flexible line associated with said wheel so that a pulling of the line will produce rotation of said parts in a direction opposite to the said normal rotation, the said cam having a plurality of actuating surfaces, whereby said cam when rotated in one continuous motion in one direction, will successively with one actuating surface, set a transmission means from a neutral setting to a setting which will produce forward operation and, with another actuating surface, operate means for closing a clutch, and whereby said cam, when rotated in one continuous motion in the opposite direction by an equal amount, will successively, with the one said cam surface, open the said clutch, and, with the other actuating surface, set the said transmission means to produce a neutral setting or one of no operation.

28. In a tractor, power means, driven wheels, means connected with the power means and the driven wheels, consisting in part of a single shaft, driven by the power means, and clutches, the driving members of which are rigidly mounted on said shaft, and which driving means are always rotated in one direction only with respect to the rotation of the power means, while the power means is in operation, driven portions of each clutch connected with the said driven wheels by further transmission means whereby the simultaneous full closing of the clutches will transmit power in equal amount and at equal speed to the driven wheels and whereby the simultaneous full opening of the said clutches will simultaneously stop the delivery of the power and rotation to the driven wheels, and whereby selective full closing of either clutch singly will transmit the full power at the full possible speed to the driven wheel, connected therewith, and whereby the selective partial closing or partial opening of either clutch will produce partial power delivery and partial speed delivery to the driven wheel connected therewith.

29. In a tractor, power means, driven wheels, a transmission means consisting in part of a single shaft driven by the power means, clutches, the driving members of which are rigidly mounted on the driven shaft, and which are always rotated in one direction only with respect to the rotation of the power means while the power means is in operation, driven portions of each clutch connected with the said driven wheels by further transmission means whereby the simultaneous full closing of the said clutches together with one setting of the transmission means will deliver full power in equal amount and equal speeds to the driven wheels, and whereby the full simultaneous closing of the said clutches together with another setting of the transmission will deliver full power in equal amounts and equal speed to the driven wheels but in an opposite direction, and whereby the selective partial closing or partial opening of either clutch will deliver partial power and partial speed to the driven wheel connected therewith and cause said wheel to be rotated in one direction or the other depending upon the setting of the transmission means.

In witness whereof, we hereunto subscribe our names to this specification.

FRANKLIN F. CHANDLER.
HENRY G. MYERS.